(12) United States Patent
Vendrow et al.

(10) Patent No.: US 8,285,267 B2
(45) Date of Patent: Oct. 9, 2012

(54) SYNCHRONIZATION IN UNIFIED MESSAGING SYSTEMS

(75) Inventors: Vlad Vendrow, Redwood Shores, CA (US); Vlad Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/277,950

(22) Filed: Oct. 20, 2011

(65) Prior Publication Data

US 2012/0039449 A1    Feb. 16, 2012

Related U.S. Application Data

(63) Continuation of application No. 12/726,332, filed on Mar. 17, 2010, which is a continuation of application No. 11/219,532, filed on Sep. 2, 2005, now Pat. No. 7,702,669.

(60) Provisional application No. 60/607,220, filed on Sep. 2, 2004.

(51) Int. Cl.
*H04W 88/02* (2009.01)

(52) U.S. Cl. ..................... 455/416; 455/414.1

(58) Field of Classification Search .................. 455/416, 455/414.1; 379/93.24, 88.13, 100.08; 709/206, 709/218; 714/20; 718/104; 726/26
See application file for complete search history.

(56) References Cited

U.S. PATENT DOCUMENTS

| | | | |
|---|---|---|---|
| 5,349,636 A | 9/1994 | Irribarren | |
| 5,379,031 A | 1/1995 | Mondrosch et al. | |
| 5,530,740 A | 6/1996 | Irribarreb et al. | |
| 5,717,742 A | 2/1998 | Hyde-Thomson | |
| 5,778,053 A | 7/1998 | Skarbo et al. | |
| 5,930,700 A | 7/1999 | Pepper et al. | |
| 5,948,059 A | 9/1999 | Woo et al. | |
| 5,951,638 A | 9/1999 | Hoss et al. | |
| 6,018,762 A | 1/2000 | Brunson et al. | |
| 6,219,694 B1 | 4/2001 | Lazaridis et al. | |
| 6,360,272 B1 | 3/2002 | Lincke et al. | |
| 6,549,612 B2 | 4/2003 | Gifford et al. | |
| 6,640,242 B1 | 10/2003 | O'Neil et al. | |
| 6,643,669 B1 | 11/2003 | Novak et al. | |
| 6,693,729 B1 | 2/2004 | Bloomfield | |
| 6,721,871 B2 | 4/2004 | Piispanen et al. | |

(Continued)

OTHER PUBLICATIONS

Request for Inter Partes Reexamination of U.S. Patent No. 7,702,669 Pursuant to 35 U.S.C. §§ 311-318 and CFR §§1.902 *et seq.* Dec. 8, 2011, 269 pages.

(Continued)

*Primary Examiner* — Diane Mizrahi
(74) *Attorney, Agent, or Firm* — Hickman Palermo Truong Becker Bingham Wong LLP

(57) ABSTRACT

In one embodiment, a HTTP connection is established from a phone that serves as a client to a server that maintains a mailbox. The mailbox includes fax messages each having properties that indicate a sender and a state that indicates at least a status of read or unread. The phone that serves as the client permits a user to view one or more of the fax messages. The states of fax messages at the server are received at the phone that serves as the client using the HTTP connection. The states of corresponding fax messages are identified at the phone that serves as the client. One or more synchronization actions are performed to synchronize the states of fax messages at the server and the states of the corresponding fax messages at the phone that serves as the client.

28 Claims, 5 Drawing Sheets

U.S. PATENT DOCUMENTS

| | | | |
|---|---|---|---|
| 6,779,019 B1 | 8/2004 | Mousseau et al. | |
| 6,792,085 B1 * | 9/2004 | Rigaldies et al. | 379/88.13 |
| 6,801,932 B1 | 10/2004 | Picoult et al. | |
| 6,857,074 B2 | 2/2005 | Bobo, II | |
| 6,983,308 B1 | 1/2006 | Oberhaus et al. | |
| 6,987,840 B1 | 1/2006 | Bosik et al. | |
| 6,993,561 B2 | 1/2006 | Lincke et al. | |
| 6,999,469 B1 * | 2/2006 | Chu et al. | 370/466 |
| 7,024,457 B1 | 4/2006 | Newman et al. | |
| 7,024,474 B2 | 4/2006 | Clubb et al. | |
| 7,047,525 B2 | 5/2006 | Prunty et al. | |
| 7,076,558 B1 | 7/2006 | Dunn | |
| 7,180,638 B1 | 2/2007 | Hou et al. | |
| 7,185,058 B2 | 2/2007 | Blackwell et al. | |
| 7,245,611 B2 | 7/2007 | Narasimhan et al. | |
| 7,286,650 B2 | 10/2007 | Pantana et al. | |
| 7,480,065 B1 | 1/2009 | Trandal et al. | |
| 7,493,367 B1 | 2/2009 | Newman et al. | |
| 7,539,291 B2 | 5/2009 | D'Angelo et al. | |
| 7,702,669 B2 * | 4/2010 | Vendrow et al. | 707/620 |
| 2001/0054115 A1 | 12/2001 | Ferguson et al. | |
| 2002/0120696 A1 | 8/2002 | Mousseau et al. | |
| 2002/0120697 A1 | 8/2002 | Generous et al. | |
| 2002/0128036 A1 | 9/2002 | Yach et al. | |
| 2002/0129174 A1 | 9/2002 | LaBaw | |
| 2002/0139822 A1 | 10/2002 | Infanti | |
| 2003/0187938 A1 | 10/2003 | Mousseau et al. | |
| 2004/0024824 A1 | 2/2004 | Ferguson et al. | |
| 2005/0153739 A1 | 7/2005 | Halsell | |
| 2005/0262436 A1 | 11/2005 | Deen et al. | |
| 2006/0171420 A1 | 8/2006 | Chu et al. | |

OTHER PUBLICATIONS

Request for Inter Partes Reexamination of U.S. Patent No. 7,02,669 Pursuant to 35 U.S.C. 311-318 and CFR 1.902 et seq. Dated Dec. 8, 2011, 269 pages.

Order Granting Request for Inter Parties Examination and Office Action received in U.S. Appl. No. 95/001,844 dated Jan. 25, 2012 (53 pages).

Requestor Comments received in U.S. Appl. No. 95/001,844 dated Apr. 12, 2012 (51 pages).

R. Braden, "Requirements for Internet Hosts—Communication Layers", Internet Engineering Task Force, Dated Oct. 1989, 116 pages.

Myers J. et al., "Post Office Protocol—Version 3", Network Working Group Request for Comments: 1939, dated May 1996, 23 pages.

Crispin M., Internet Message Access Protocol-Version 4rev1, Network Working Group, dated Dec. 1996, 82 pages.

Fielding R. et al., "Hypertext Transfer Protocol—HTTP/1.1", Network Working Group, Request for Comments: 2616, dated Jun. 1999, 176 pages.

Postel, Jonathan B., "Simple Mall Transfer Protocol", Information Sciences Institute, University of Southern California, dated Aug. 1982, 72 pages.

Crocker, David, H., "Standard for the Format of ARPA Internet Text Message", Dept. of Electrical Engineering, dated, Aug. 13, 1982, 50 pages.

Boyce, J., "Microsoft Office Outlook 2003 Inside Out," Nov. 19, 2003, Microsoft Press, Redmond, Washington (14 pages).

Restriction Requirement received in U.S. Appl. No. 13/281,213 dated Feb. 15, 2012 (8 pages).

Notice of Publication of Application received in U.S. Appl. No. 13/281,213 published Feb. 16, 2012 (1 page).

Action Closing Prosecution received in U.S. Appl. No. 95/001,844 dated May 3, 2012 (140 pages).

Preliminary Amendment and Response to Restriction Requirement filed Jun. 8, 2012 (14 pages).

Inter Partes Reexamination No. 95/001,844, "Amendment", dated Mar. 13, 2012, 57 pages.

Inter Partes Reexamination No. 95/001,844, "Response to Office Action in Inter Partes Reexamination", dated Jul. 3, 2012, 55 pages.

Inter Partes Reexamination No. 95/001,844, Patent Owner's Petition Under 37 C.F.R 1.181, dated Jul. 3, 2012, 4 pages.

Requesters Response, Control No. 95/001,844, "Comments by Third Party Requester", dated, Dated Aug. 2, 2012, 55 pages.

Nter Partes Reexamination No. 95/001,844, Requesters Response to Patent Owner's Petition Under 37 C.F.R 1.81, dated Aug. 2, 2012, 7 pages.

* cited by examiner

SYNCHRONIZATION IN UNIFIED MESSAGING SYSTEMS

CROSS-REFERENCE TO RELATED APPLICATIONS

This application is a continuation of U.S. application Ser. No. 12/726,332, filed on Mar. 17, 2010 by Vlad Vendrow and Vlad Shmunis, entitled "Synchronization in Unified Messaging Systems", the contents of which are incorporated by reference herein in their entirety. U.S. application Ser. No. 12/726,332 is a continuation of U.S. application Ser. No. 11/219,532, now issued as U.S. Pat. No. 7,702,669, filed on Sep. 2, 2005. U.S. application Ser. No. 11/219,532 is a non-provisional application of and claims priority to U.S. Application Ser. No. 60/607,220, filed on Sep. 2, 2004.

BACKGROUND

The present application relates generally to messaging systems. A messaging system can be used to convey information from a sender to a recipient. Conventional messaging systems use various input and delivery mechanisms including telephones, pagers, computers, recorders, answering machines and other systems to formulate and deliver the message content.

SUMMARY OF THE INVENTION

According to one aspect, a unified messaging system includes a server configured to store a plurality of server messages, a client configured to store a plurality of client messages and a synchronization application which synchronizes the client messages with the server messages associated with the client. The server messages includes voicemail messages and fax messages for a client, and the client messages includes voicemail messages and fax messages for the client and correspond generally to the server messages.

In some implementations, one or more of the following features may be present. The server messages include received messages and sent messages, and the client messages include received messages and sent messages. Each of the server messages includes a server message index and a read/unread status, each of the client messages includes a client message index and a read/unread status, and synchronizing the client messages with the server messages includes synchronizing server message indices with client message indices, and server message read/unread statuses with client message read/unread statuses.

In another implementation, the synchronization application determines whether a server message on the server has previously been synchronized to establish a corresponding client message on the client.

According to another aspect, a synchronization method includes storing a plurality of server messages containing voicemail messages and fax messages on a server, storing a plurality of client messages containing voicemail messages and fax messages corresponding generally to the server messages on a client, and synchronizing the client messages with the server messages.

In a related aspect, a synchronization method includes storing a plurality of server messages containing voicemail messages and fax messages on a server, storing a plurality of client messages containing voicemail messages and fax messages corresponding generally to the server messages on a client, and generating an identifier on the client and the server at each synchronization.

In various implementations, one or more of the following advantages may be present. Based on the results of the discrepancy assessment established during the synchronization, the synchronization application creates a list of synchronization actions that can be performed in order to synchronize the messages on the server with the messages on the client without having a need to maintain a history of all prior messages on the client. The state of messages on the client may also be updated so that requests may be sent to the server to update the state of messages on the server.

Other features and advantages will be readily apparent from the following detailed description, the accompanying drawings and the claims.

DETAILED DESCRIPTION

Figure 1:
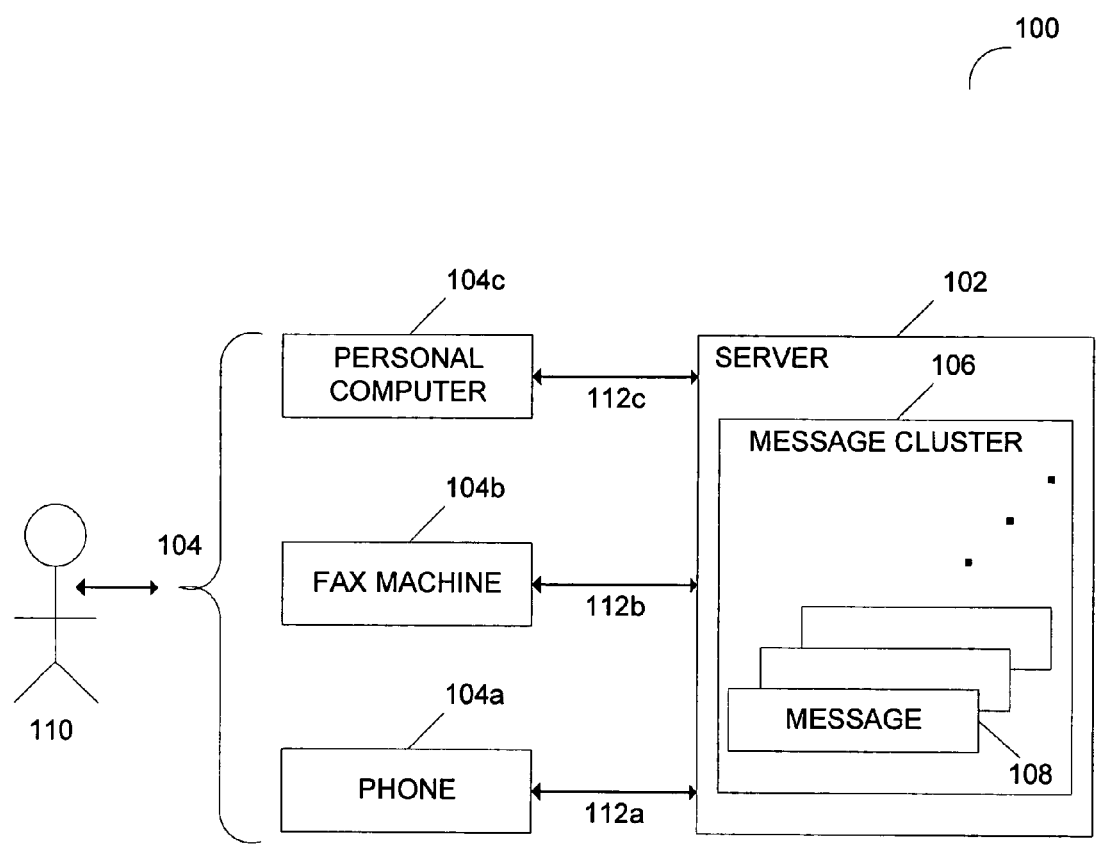
FIG. 1 is a block diagram of a unified messaging system according to one implementation.

As shown in FIG. 1, a unified messaging system 100 integrates several different communications media to allow a user 110 to send and retrieve voice 112a, fax 112b, and messages 112c (e.g., e-mail, text, etc.) from a single interface, whether it be a phone 104a, a fax machine 104b, or a personal computer 104c.

A unified messaging system 100 includes a server 102 that can store messages 108 of different types and of different communications media (e.g., received messages, sent messages, voicemail messages, fax messages, etc.). Messages 108 are grouped into message clusters 106, or mailboxes, that are associated with individual users 110, or groups of users. In one implementation, each individual message 108 includes, but is not limited to, a unique message index (e.g. identifiers), message content (e.g., voice, video, data), message properties (e.g., date and time, sender information), and message status (e.g., read, unread). A particular combination of message indexes and message statuses of all messages 108 in a given message cluster 106 is referred to as the state of the messages in the given cluster 106.

The unified message system 100 further includes one or more clients 104 for a given user 110. A client 104 can store local copies of the messages 108 that are stored on the server 102. A client 104 can include a synchronization application (discussed in greater detail below) that periodically synchronizes the client 104 with the server 102 to ensure that the state of messages on the server 102 is the same as the state of messages on the client 104. Discrepancies between the state of messages on the server 102 and the state of messages on the client 104 arise as a result of the user 110 deleting a message (e.g., on the server 102 and not deleting the message on the client 104, and visa versa), messages arriving at the server 102 and not being loaded on the client 104, the user 110 viewing a message on a client device or at the server 102, and so on. In one implementation, the synchronization application is not an e-mail application.

Figure 2A:
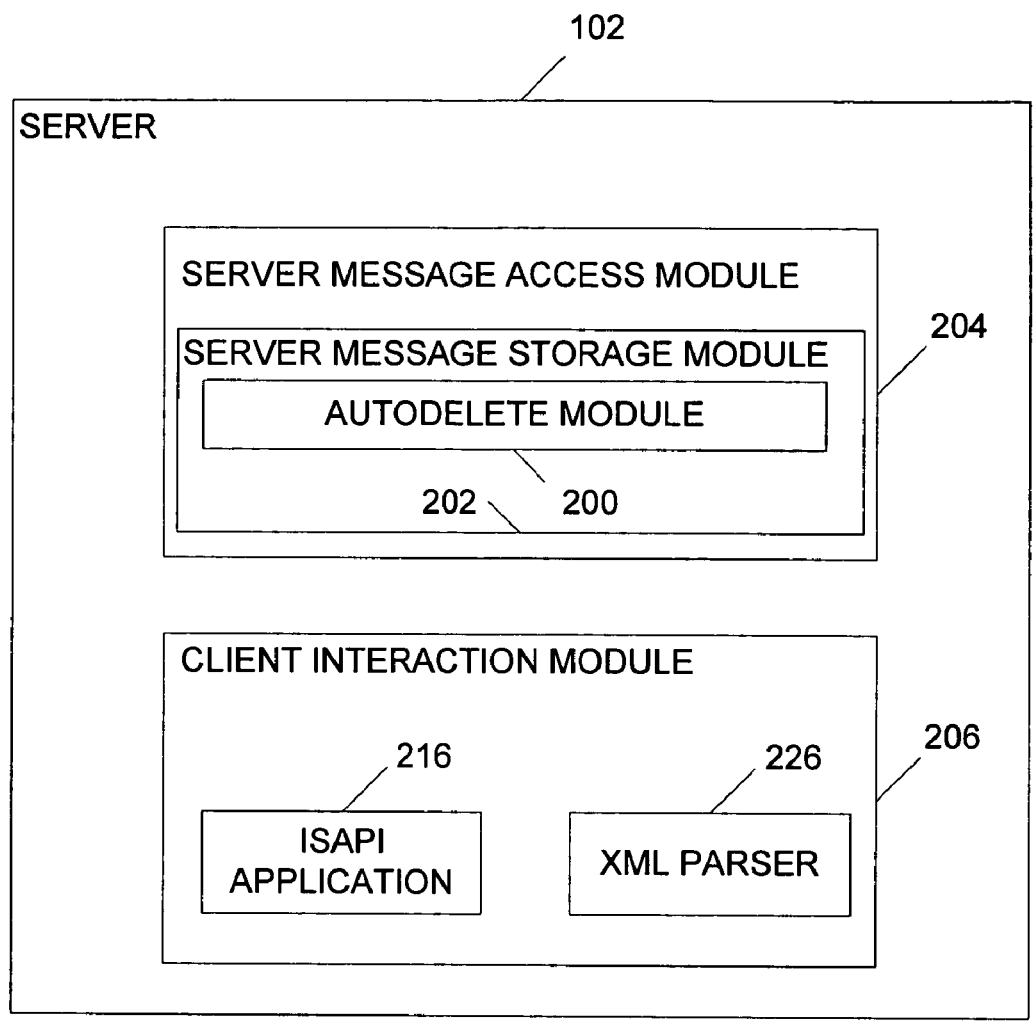
FIG. 2A is a block diagram of a server.

FIG. 2A illustrates components of a server 102 according to one implementation. The server 102 includes a server message storage module 202, which manages the storage of messages on the server 102. The server message storage module 202 can be an actual location where the messages are stored. Alternatively, the server message storage module 202 can contain information as to where and how the messages are stored on the server 102 or an external server.

The server 102 further includes an autodelete module 200, which automatically deletes certain messages 108 from the server 102 at predetermined intervals. For instance, the server 102 can be configured such that a given message 108 that arrives at the server 102 is automatically deleted from the server ten days after arriving. The autodelete module 202 can be a part of the server message storage module 202.

The server 102 further includes a server message access module 204, which is an interface to the server message storage module 202. The content and the properties of a given message in the server message storage module 202 are accessed and manipulated through the server message access module 204. The server message storage module 202 can be a part of the server message access module 204.

The server 102 further includes a client interaction module 206 through which the server 102 interacts with a client 104. In particular, the server 102 uses the client interaction module 206 to receive and process requests from a client 104. In one implementation, the client interaction module 206 includes an Internet Server Application Program Interface (ISAPI) application 216 for receiving the requests and an XML parser 226 for processing the requests. The client interaction module 206 can also include a telephone access interface (not shown), e.g., HTTP stream interface, and a web access (not shown), e.g., IVR interface.

Figure 2B:
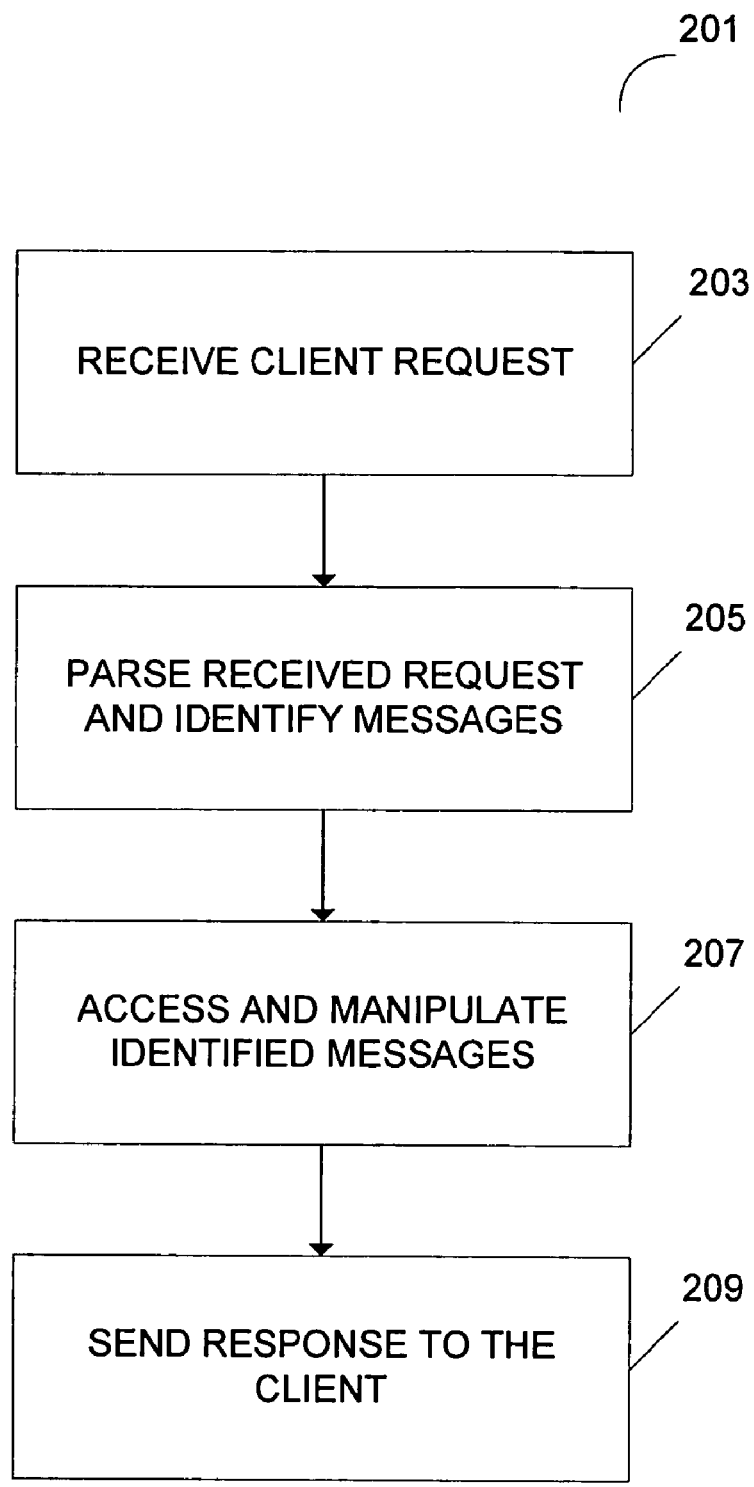
FIG. 2B is a flowchart illustrating a sequence of steps for processing a client request on a server.

Accordingly, as shown in a flow chart in FIG. 2B, the steps 201 for processing a request from a client 104 on the server 102 include receiving the request through, for example, the ISAPI application 216 (step 203). Processing the client's request further includes parsing the request using, for example, the XML parser 226 (step 205), which identifies the messages in the server message storage module 202 that need to be accessed. Processing the client's request further includes accessing the identified messages through the server message access module 204 and manipulating the identified messages in the server message storage module 202 per the client's request (207). Optimally, processing the client's request further can include sending a response to the client 104 (step 209). For instance, the response can include information requested by the client 104 and/or information as to whether the request was processed successfully or if there were errors.

Figure 3A:
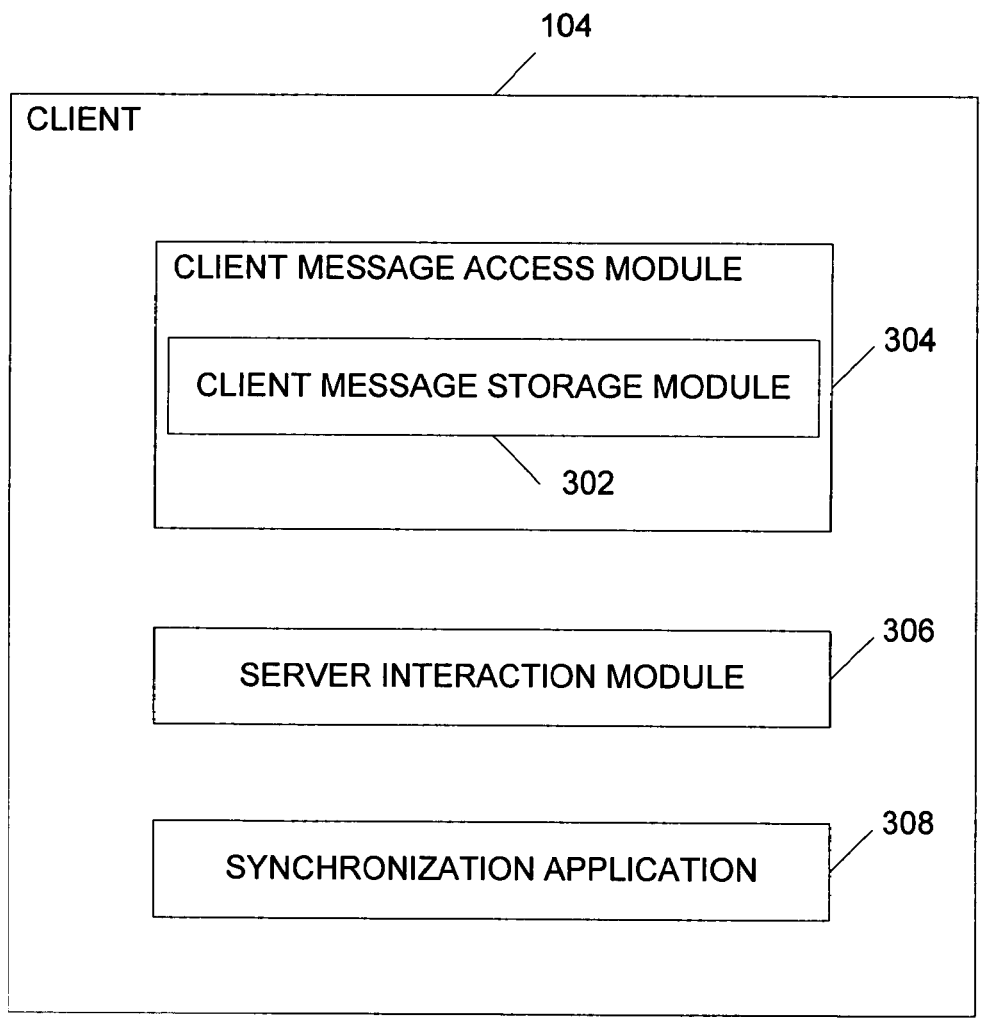
FIG. 3A is a block diagram of a client.

FIG. 3A illustrates components of a client 104 according to one implementation. The client 104 includes a client message storage module 302, which manages the storage of messages on the client 104. The client message storage module 302 can be an actual location where the messages are stored. Alternatively, the client message storage module 302 can contain information as to where and how the messages are stored on the client 104 or an external device.

The client 104 further includes a client message access module 304, which is an interface to the client message storage module 302. The content and the properties of a given message in the client message storage module 302 are accessed and manipulated through the client message access module 304. The client message storage module 302 can be part of the client message access module 304.

The client 104 further includes a server interaction module 306 through which the client 104 interacts with the server 102. In particular, the client 104 sends requests to the server 102 and receives the server's responses through the server interaction module 306. To send a request to the server 102, the client 104 first uses the server interaction module 306 to connect to the server 102 by establishing, for example, an HTTP connection. Subsequently, the server interaction module 306 exchanges data with the server 102 specific to the request using, for example, an XML parser.

The client 104 further includes a synchronization application 308, which is responsible for synchronizing the messages on the server 102 with the messages on the client 104. In particular, the synchronization application 104 receives the state of messages in the server message storage module 202 on the server 102 and compares it with the state of the messages in the client message storage module 302 on the client 104. The synchronization application 308 further identifies a set of actions that need to be performed to synchronize the messages on the server 102 with the messages on the client 104 and subsequently performs those actions.

Figure 3B:
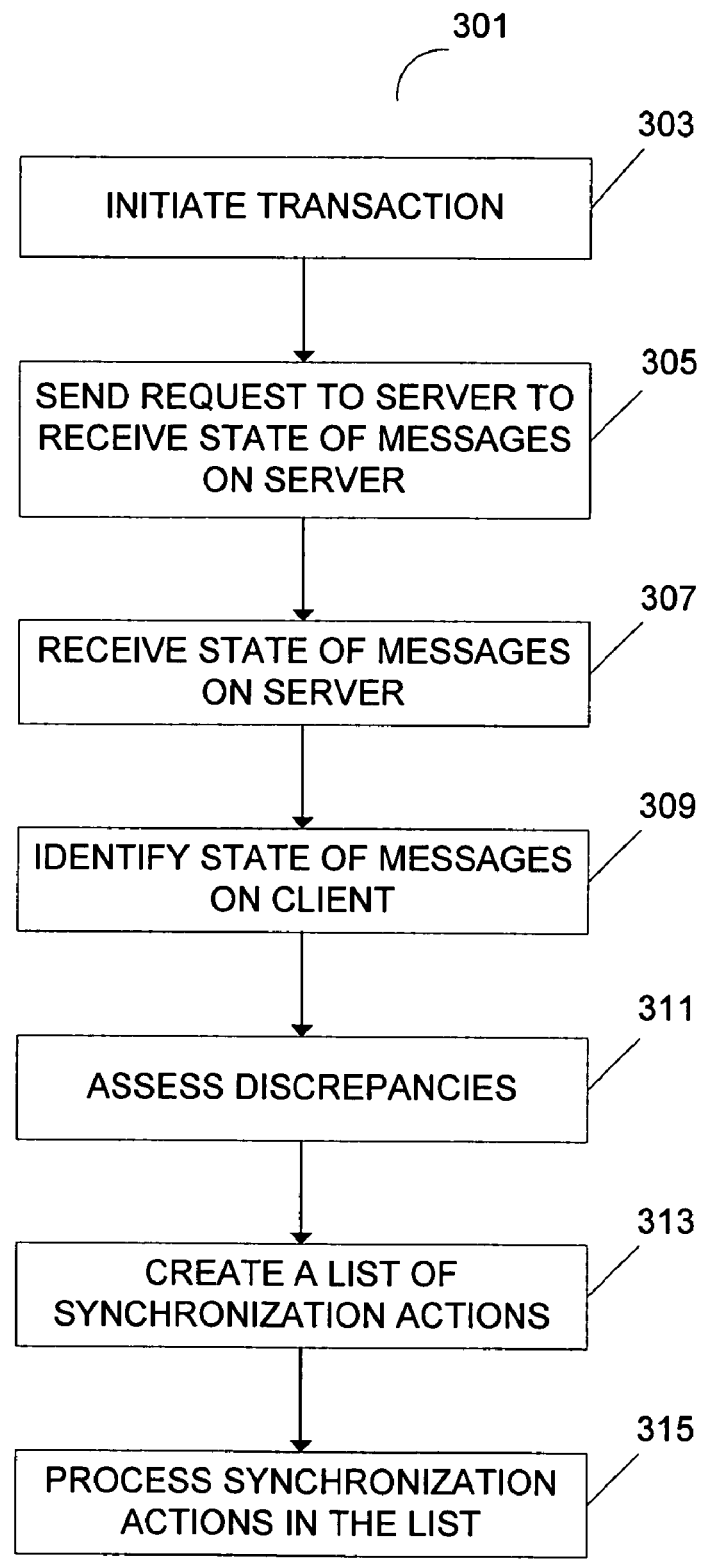
FIG. 3B is a flowchart illustrating a client-based synchronization process.
Like reference numbers and designations in the various drawings indicate like elements.

A process 301 that the synchronization application 308 uses to synchronize the messages on the server 102 with the messages on the client 104, according to one implementation, is outlined in more detail in FIG. 3B. Referring now to FIGS. 1 and 3B, the synchronization application 308 on the client 104 initiates synchronization (step 303) by establishing, for example, an HTTP connection with the server 102. A variety of conditions can cause the synchronization application 308 on the client 104 to initiate synchronization. For instance, the synchronization application 308 on the client 104 can initiate synchronization when it receives a new message notification from the server 102. The synchronization application 308 on the client 104 can also initiate synchronization when a message on the client 104 is deleted.

In one implementation, an unique ID is generated at each synchronization and saved on both the client 104 and the server 102. Prior to initiating the next synchronization, the client 104 transfers this unique ID to the server 102. The synchronization application 308 on the client 104 can proceed to synchronize the message on the client 104 and the server 102 after the server 102 compares and determines that the unique ID received from the client 104 and that saved on the server 102 corresponds. If the unique ID received from the client 104 and that is saved on the server 102 do not correspond, synchronization application 308 does not initiate a synchronization so as to avoid any unnecessary synchronization.

Other conditions that cause the synchronization application 308 on the client 104 to initiate synchronization can include, but are not limited to, the user 110 requesting synchronization, the client 104 connecting to the server 102, the state of the client 104 changing from offline to online, or a message on the client 104 changing status, a timer associated. Also, synchronization can be performed at predetermined intervals and initiated, for instance, by a synchronization timer.

Once synchronization is initiated (step 303), the synchronization application 308 on the client 104 sends a request to the server 102 through the server interaction module 306 to receive the state of the messages stored on the server 102 (step 305). The server 102 processes the request according to the steps outlined in reference to FIG. 2B and can send a response containing information about the state of the messages stored on the server 102 to the client 104.

Once the client 104 receives the state of the messages stored on the server 102 (step 307), the synchronization application 308 identifies the state of the messages stored on the client 104 (step 309) using the client message access module 304.

Subsequently, the client's synchronization application 308 assesses the discrepancies between the state of messages stored on the server 102 and the state of messages stored on the client 104 (step 311). In one implementation the discrepancy assessment involves comparing the indexes of the messages stored on the server 102 with the indexes of the messages stored on the client 104. For example, if the indexes of the messages on the server 102 are 1001, 1002, 1003 and 1004, and the indexes of the messages on the client 104 are 1001, 1002, and 1004, the message with index 1003 has been deleted from the client 104 but not from the server 102. The discrepancy assessment can further include comparing the statuses of the messages with the same indexes on the client 104 and on the server 102.

Based on the results of the discrepancy assessment (step 311) the synchronization application 308 creates a list of synchronization actions that need to be performed in order to synchronize the messages on the server 102 with the messages on the client 104 (step 313). The synchronization actions can include, but are not limited to, deleting messages on the client 104, changing the status of a given message of the client 104, sending a request to the server 102 to delete messages on the server 102, sending a request to the server 102 to change the status of a given message on the server 102. In one implementation, a list of synchronization actions is created based on the following rules:

1) If a new message has been added on the server 102 since the last synchronization (e.g., a new message has been received), the message is added on the client 104.

2) If a new message has been added on the client 104 since the last synchronization (e.g., a new message has been sent), the message is added on the server 102.

3) If a message on the server 102 has been marked as "read" since the last synchronization, the corresponding message on the client 104 is also marked as "read".

4) If a message on the client 104 has been marked as "read" since the last synchronization, the corresponding message on the server 102 is also marked as "read".

5) If a message on the server 102 has been marked as "unread" since the last synchronization, the corresponding message on the client 104 is also marked as "unread".

6) If a message on the client 104 has been marked as "unread" since the last synchronization, the corresponding message on the server 102 is also marked as "unread".

7) If a message on the server 102 has been deleted since the last synchronization, and the deletion was not performed by the autodelete module 200, the corresponding message on the client 104 is also deleted.

8) If a message on the client 104 has been deleted since the last synchronization, the corresponding message on the server 102 is also deleted.

Once the list of synchronization actions is created, the synchronization application 308 performs the synchronization actions in the list (step 315). Performing synchronization actions in the list can include, but is not limited to, updating the state of messages on the client 104 and sending requests to the server 102 to update the state of messages on the server 102.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and anyone or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN"), e.g., a wireless LAN, and a wide area network ("WAN"), e.g., the Internet.

The invention has been described in terms of particular embodiments, but other embodiments can be implemented and are within the scope of the following claims. For example, the operations of the invention can be performed in a different order and still achieve desirable results. As one example, the process depicted in FIG. 3B does not require the particular order shown, or sequential order, to achieve desirable results (e.g., step 305 can follow steps 307 and 309). Furthermore, synchronization application 308 can run on the client 104, or on the server 102. Moreover, a portion of the synchronization application 308 can run on the client 104, and a portion of the synchronization application 308 can run on the server 102. In certain implementations, multitasking and parallel processing may be preferable.

What is claimed is:

1. A method, comprising,
    causing a Hypertext Transfer Protocol (HTTP) connection to be established between a phone of a user that serves as a client and a server that maintains a mailbox associated with the user, the mailbox to include one or more fax messages each having properties that indicate a sender of the fax message and a state that indicates at least a status of read or unread for the fax message, the phone that serves as the client to permit the user to view the one or more fax messages included in the mailbox;
    using the HTTP connection to receive, at the phone that serves as the client, data that identifies states of the one or more fax messages at the server;
    identifying states of one or more corresponding fax messages at the phone that serves as the client; and
    performing, by a synchronization application executed on one or more processors, one or more synchronization actions using the HTTP connection to synchronize the states of the one or more fax messages at the server and the states of the one or more corresponding fax messages at the phone that serves as the client, the one or more synchronization actions comprising:
        when the state of a fax message at the server has been changed to indicate a status of read, and the state of the fax message at the phone that serves as the client indicates a status of read, cause the state of the fax message at the phone that serves as the client to be changed to also indicate the status of read, and
        when the state of a fax message at the phone that serves as the client has been changed to indicate a status of read, and the state of the fax message at the server indicates a status of unread, cause the state of the fax message at the server to be changed to also indicate the status of read.

2. The method of claim 1, wherein the mailbox further includes one or more voicemail messages, the phone that serves as the client permits the user to access the one or more voicemail messages included in the mailbox, the HTTP connection is further used to receive states of the one or more voicemail messages at the server, the identifying further identifies states of one or more corresponding voicemail messages at the phone that serves as the client, and the one or more synchronization actions further comprising:
    when the state of a voicemail message at the server has been changed to indicate a status of read, and the state of the voicemail message at the phone that serves as the client indicates a status of unread, cause the state of the voicemail message at the phone that serves as the client to be changed to also indicate the status of read, and
    when the state of a voicemail message at the phone that serves as the client has been changed to indicate a status of read, and the state of the voicemail message at the server indicates a status of unread, cause the state of the voicemail message at the server to be changed to also indicate the status of read.

3. The method of claim 1, wherein the one or more synchronization actions further comprise:
    when a new fax message has been added at the server, cause the new fax message to be added at the phone that serves as the client,
    when a new fax message has been added at the phone that serves as the client, cause the new fax message to be added at the server,
    when an existing fax message has been deleted at the server, cause the existing fax message to be deleted at the phone that serves as the client, and
    when an existing fax message has been deleted at the phone that serves as the client, cause the existing fax message to be deleted at the server.

4. The method of claim 1, wherein the one or more synchronization actions further comprise:
    when the state of a fax message at the server has been changed to indicate a status of unread, and the state of the fax message at the phone that serves as the client indicates a status of read, cause the state of the fax message at the phone that serves as the client to be changed to also indicate the status of unread.

5. The method of claim 1, wherein each of one or more fax messages has a corresponding index and the method further comprises:
    performing a discrepancy assessment that includes comparing the status of any of the one or more fax messages at the server to the status of any of the one or more fax messages at the phone that serves as the client that have a same index; and
    using the discrepancy assessment to determine the one or more synchronization actions.

6. The method of claim 1, further comprising:
    creating a list of synchronization actions,
    wherein the performing one or more synchronization actions performs one or more synchronization actions of the list of synchronization actions.

7. The method of claim 1, wherein the performing one or more synchronization actions further comprises:
    generating a unique identifier (ID) for the one or more synchronization actions that is saved at both the server and at the phone that serves as the client.

8. The method of claim 1, wherein the performing one or more synchronization actions further comprises:
    transferring to the server a unique identifier (ID) that was generated in a prior synchronization and was stored at the phone that serves as the client; and
    proceeding with the one or more synchronization actions provided the unique ID stored at the phone that serves as the client corresponds to a unique ID stored at the server.

9. The method of claim 1, wherein the performing one or more synchronization actions is in response to a state change from offline to online at the phone that serves as the client.

10. The method of claim 1, wherein local copies of the one or more corresponding fax messages are stored at the phone that serves as the client.

11. The method of claim 1, wherein the one or more synchronization actions cause the state of the fax message at the server to be changed to also indicate the status of read by sending a request to the server to change the state of the fax message at the server.

12. A method, comprising, causing a Hypertext Transfer Protocol (HTTP) connection to be established between a client embodied as a phone and a server that maintains a mailbox associated with the user, the mailbox storing one or more voicemail messages and one or more fax messages for the user, each of the one or more voicemail messages and the one fax messages having properties that indicate a source of the voicemail message or the fax message and a state that indicates a status of read or unread for the voicemail message or the fax message, the client embodied as a phone to permit the user to access the one or more voicemail messages and the one or more fax messages included in the mailbox;

using the HTTP connection to receive, at the client embodied as the phone, data identifying states of the one or more voicemail messages and the one or more fax messages at the server;

identifying states of one or more corresponding voicemail messages and one or more corresponding fax messages at the client embodied as the phone; and performing, at least in part by one or more processors executing one or more computer programs, one or more synchronization actions using the HTTP connection to synchronize the states of the one or more voicemail messages and the one or more fax messages at the client embodied as the phone and the states of the one or more corresponding voicemail messages and the one or more fax messages at the server, the one or more synchronization actions comprising:

when a new voicemail message or fax message has been added at the server since one or more last synchronization actions, cause the new voicemail message or fax message to be added at the client embodied as the phone, when a new voicemail message or fax message has been added at the client embodied as the phone since one or more last synchronization actions, cause the new voicemail message or fax message to be added at the server, when the state of a voicemail message or fax message at the server has been changed to indicate a status of read since one or more last synchronization actions, and the state of the voicemail message or fax message at the client embodied as the phone indicates a status of unread, cause the state of the voicemail message or fax message at the client embodied as the phone to be changed to also indicate the status of read, and when the state of a voicemail message or fax message at the client embodied as the phone has been changed to indicate a status of read since one or more last synchronization actions, and the state of the voicemail message or fax message at the server indicates a status of unread, cause the state of the voicemail message or fax message at the server to be changed to also indicate the status of read.

13. The method of claim 12, the one or more synchronization actions further comprising:

when an existing voicemail message or fax message has been deleted at the server since one or more last synchronization actions, cause the existing voicemail message or fax message to be deleted at the client embodied as the phone, and when an existing voicemail message or fax message has been deleted at the client embodied as the phone since one or more last synchronization actions, cause the existing voicemail message or fax message to be deleted at the server.

14. The method of claim 12, wherein the one or more synchronization actions further comprise:

when the state of a voicemail message or fax message at the server has been changed to indicate a status of unread since one or more last synchronization actions, and the state of the voicemail message or fax message at the client embodied as the phone indicates a status of read, cause the state of the voicemail message or fax message at the client embodied as the phone to be changed to also indicate the status of unread.

15. The method of claim 12, wherein each of the one or more fax messages and the one or more voicemail messages has a corresponding index and the method further comprises:

comparing the status of any of the one or more voicemail messages and any of the one or more fax messages at the server to the status of any of the one or more voicemail messages and any of the one or more fax messages at the client embodied as the phone that have a same index; and using the comparing to determine the one or more synchronization actions.

16. The method of claim 12, wherein the performing one or more synchronization actions further comprises:

generating a unique identifier (ID) for the one or more synchronization actions that is saved at both the server and the client embodied as the phone.

17. The method of claim 12, wherein the performing one or more synchronization actions further comprises:

transferring to the server a unique identifier (ID) that was generated in a prior synchronization and was stored at the client embodied as the phone; and proceeding with the one or more synchronization actions provided the unique ID stored at the client embodied as the phone corresponds to a unique ID stored at the server.

18. The method of claim 12, wherein the performing one or more synchronization actions is in response to a state change from offline to online at the client embodied as the phone.

19. The method of claim 12, wherein local copies of the one or more corresponding voicemail messages and the one or more corresponding fax messages are stored at the client embodied as the phone.

20. A non-transitory machine-readable storage device containing one or more computer programs, the one or more computer programs, when executed by one or more processors, operable to:

cause one or more Hypertext Transfer Protocol (HTTP) connections to be established between a client and a server that maintains a mailbox associated with a user, the mailbox to include voicemail messages and fax messages each having properties that indicate a sender of the voicemail message or fax message and a state that indicates at least a status of read or unread for the voicemail message or fax message;

permit the user to view through a single user interface at the client the voicemail messages and fax messages as well as respective states of the voicemail messages and fax messages;

identify states of the voicemail messages and fax messages at the server;

identify states of corresponding voicemail messages and fax messages at the client; and use the one or more HTTP connections to the server, to perform one or more synchronization actions to synchronize the states of the voicemail messages and fax messages at the server and the states of the corresponding voicemail messages and fax messages at the client, the one or more synchronization actions comprising:

when a new voicemail message or fax message has been added at the server since one or more last synchronization actions, cause the new voicemail message or fax message to be added at the client, when a new voicemail message or fax message has been added at the client since one or more last synchronization actions, cause the new voicemail message or fax message to be added at the server, when the state of a voicemail message or fax message at the server has been changed to indicate a status of read since one or more last synchronization actions, and the state of the voicemail message or fax message at the client indicates a status of unread, cause the state of the voicemail message or fax message at the client to be changed to also indicate the status of read, and when the state of a voicemail message or fax message at the client has been changed to indicate a status of read since one or more last synchronization actions, and the state of the voicemail message or fax message at the server indicates a status of unread, cause the state of the voicemail message or fax message at the server to be changed to also indicate the status of read.

21. The non-transitory machine-readable storage device containing one or more computer programs of claim 20, the one or more synchronization actions comprising:

when an existing voicemail message or fax message has been deleted at the server since one or more last synchronization actions, cause the existing voicemail message or fax message to be deleted at the client, and when an existing voicemail message or fax message has been deleted at the client since one or more last synchronization actions, cause the existing voicemail message or fax message to be deleted at the server.

22. The non-transitory machine-readable storage device containing one or more computer programs of claim 20, wherein the one or more computer programs that, when executed by the one or more processors, are operable to identify states of voicemail messages and fax messages at the server are further, when executed by the one or more processors, operable to send a request from the client to the server and receive a response from the server that indicates the states of voicemail messages and fax messages at the server.

23. A message synchronization system comprising:

one or more server computing devices comprising one or more processors, one or more first non-transitory computer-readable storage media, and one or more second non-transitory computer-readable storage media;

the one or more first non-transitory computer-readable storage media storing a plurality of fax messages associated with a user, each fax message of the plurality of stored fax messages having properties that indicate a sender of the each fax message and a status of read or unread for the each fax message; and the one or more second non-transitory computer-readable storage media storing instructions which, when executed by the one or more processors, causes performance of a method comprising:

causing one or more Hypertext Transfer Protocol (HTTP) connections to be established between a phone that serves as a client and one or more of the server computing devices;

identifying states of the plurality of fax messages stored on the first non-transitory computer-readable storage media;

identifying states of corresponding fax messages at the phone that serves as the client; and using the one or more HTTP connections to perform one or more synchronization actions to synchronize the states of the plurality of fax messages stored on the first non-transitory computer-readable storage media and the states of the corresponding fax messages at the phone that serves as the client, the one or more synchronization actions comprising:

when the state of a fax message of the plurality of fax messages stored on the first non-transitory computer-readable storage media has been changed to indicate a status of read, and the state of a corresponding fax message at the phone that serves as the client indicates a status of unread, cause the state of the corresponding fax message at the phone that serves as the client to be changed to also indicate the status of read, and when the state of a fax message at the phone that serves as the client has been changed to indicate a status of read, and the state of a corresponding fax message of the plurality of fax messages stored on the first non-transitory computer-readable storage media indicates a status of unread, cause the state of the corresponding fax message of the plurality of fax messages stored on the first non-transitory computer-readable storage media to be changed to also indicate the status of read.

24. The system of claim 23, wherein the one or more first non-transitory computer-readable storage media further store voicemail messages, the method further comprising:

identifying states of the voicemail messages stored on the first non-transitory computer-readable storage media;

identifying states of corresponding voicemail messages at the phone that serves as the client; and using the one or more HTTP connections to perform one or more synchronization actions to synchronize the states of the voicemail messages stored on the first non-transitory computer-readable storage media and the states of the corresponding voicemail messages at the phone that serves as the client, the one or more voicemail messages synchronization actions comprising:

when the state of a voicemail message stored on the first non-transitory computer-readable storage media has been changed to indicate a status of read, and the state of a corresponding voicemail message at the phone that serves as the client indicates a status of unread, cause the state of the corresponding voicemail message at the phone that serves as the client to be changed to also indicate the status of read, and when the state of a voicemail message at the phone that serves as the client has been changed to indicate a status of read, and the state of a corresponding voicemail message stored on the first non-transitory computer-readable storage media indicates a status of unread, cause the state of the corresponding voicemail message stored on the first non-transitory computer-readable storage media to be changed to also indicate the status of read.

25. The system of claim 23, wherein the one or more synchronization actions further comprise:

when a new fax message has been stored on the first non-transitory computer-readable storage media, cause the new fax message to be stored at the phone that serves as the client;

when a new fax message has been stored at the phone that serves as the client, cause the new fax message to be stored on the first non-transitory computer-readable storage media;

when an existing fax message has been deleted from the first non-transitory computer-readable storage media, cause the existing fax message at the phone that serves as the client to be deleted; and when an existing fax message has been deleted at the phone that serves as the client, cause the existing fax message stored on the first non-transitory computer-readable storage media to be deleted.

26. The system of claim 23, wherein the one or more synchronization actions further comprise:

when the state of a fax message stored on the first non-transitory computer-readable storage media has been changed to indicate a status of unread, and the state of the fax message at the phone that serves as the client indicates a status of read, cause the state of the fax message at the phone that serves as the client to be changed to also indicate the status of unread.

27. The system of claim 23, the method further comprising generating a unique identifier (ID) that is saved at both the server and the phone.

28. The system of claim 23, further comprising the client, the client comprising one or more processors and logic encoded in one or more third non-transitory computer-readable media which, when executed by the one or more processors of the client, causes the client to perform permitting the user to view, through a single user interface at the client, one or more fax messages and the synchronized state of the one or more fax messages.

* * * * *